Dec. 14, 1937.    W. BAUSCH    2,101,928
MICROSCOPE
Filed Nov. 22, 1934
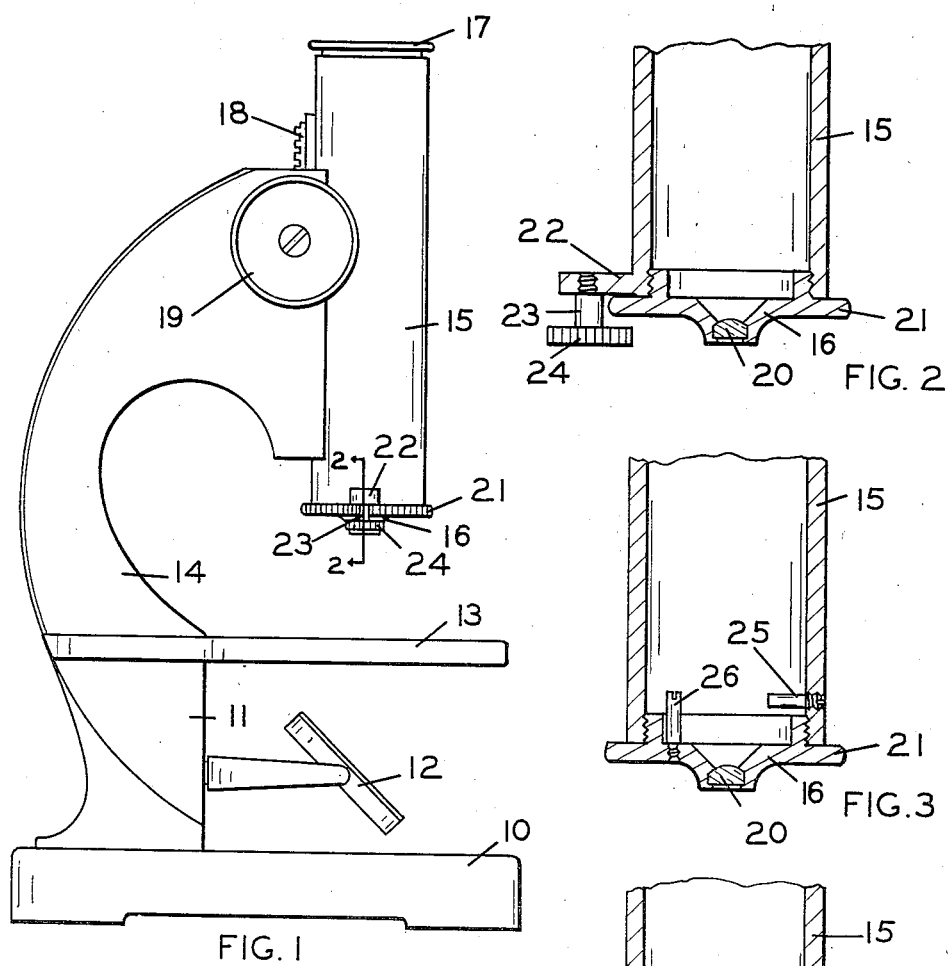
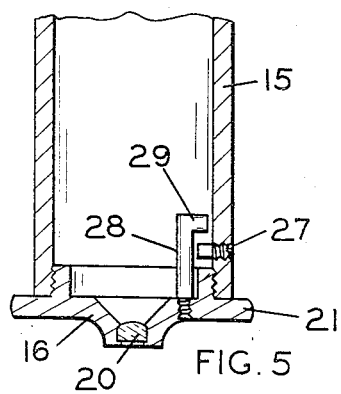
WILLIAM BAUSCH
INVENTOR Patented Dec. 14, 1937

2,101,928

UNITED STATES PATENT OFFICE 2,101,928

MICROSCOPE

William Bausch, Rochester, N. Y., assignor to Bausch & Lomb Optical Company, Rochester, N. Y., a corporation of New York Application November 22, 1934, Serial No. 754,297

4 Claims. (Cl. 88—39)

The present invention relates to microscopes and more particularly to a fine adjustment mechanism for a relatively simple form of compound microscope.

One of the objects of the present invention is to provide a simple form of compound microscope having both a coarse and a fine adjustment mechanism. Another object is to provide a fine adjustment mechanism which is simple and easy to manufacture yet rugged and effective in operation. A further object is to provide a fine adjustment mechanism comprising a threaded mount for the objective lens and stops to limit the extent of adjustment. These and other objects and advantages reside in certain novel features of construction, arrangement and combinations of parts as will hereinafter be more fully set forth and pointed out in the appended claims.

In the drawing:

Fig. 1 is a side elevation of a microscope embodying my invention.

Fig. 2 is a vertical section taken on line 2—2 of Fig. 1.

Fig. 3 is a vertical section of a modification.

Fig. 4 is a vertical section of another modification.

Fig. 5 is a vertical section of a third modification.

Fig. 1 illustrates a microscope having a base 10, an upright column 11 carrying a mirror 12 and a stage 13 and an arm 14 supported on the column 11. A body tube 15 carrying the objective mount 16 and eyepiece 17 is slidably mounted on the arm 14 and is focused by means of the rack 18 on the body tube 15 and a pinion, not shown, which is mounted in the arm 14 and can be turned by means of the knob 19.

The body tube 15 is threaded at its lower end and the objective mount 16, carrying the objective 20, is threaded into the body tube 15. The objective mount 16 has a shoulder 21 which limits the movement of the objective mount 16 into the body tube 15 while the knurled edge of the shoulder 21 provides a convenient grip for rotating the objective mount 16 to make fine adjustments of focus. As the threads connecting the objective mount 16 to the body tube 15 serve both to support the mount and provide a fine adjustment, it is necessary to limit the extent of movement of the mount out of the tube 15 to prevent dropping of the objective mount 16 with the consequent damage to the objective 20.

In the form shown in Figs. 1 and 2, the body tube 15 has an outwardly extending bracket 22 in which the screw 23 is threaded. This screw 23 has a large head 24 extending beyond the edge of the shoulder 21 of the objective mount 16. The body portion of the screw 23 between the bracket 22 and the head 24 is shorter than the threaded portion of the objective mount 16 so that while the mount 16 may be freely screwed into and out of the body tube 15 for focusing it cannot be completely removed from the body tube unless the screw 23 is first removed from the bracket 22.

Referring to Fig. 3, a pin 25 is fastened in the wall of the body tube 15 and extends inwardly substantially perpendicular to the axis of the tube. A second pin 26 is secured eccentrically of the objective mount 16 inside the tube 15 and extends substantially parallel to the tube axis. With this arrangement it is impossible to obtain a complete rotation of the objective mount because of the interference between the two pins 25 and 26. Thus a small range of focusing movement is permitted while preventing removal of the objective mount 16. The modification shown in Fig. 4 is identical in operation with that shown in Fig. 3 but in the form shown in Fig. 4, the cooperating pins 25' and 26' are outside the tube 15 rather than inside.

In the form shown in Fig. 5 a short pin 27 is secured to the tube 15 and extends inwardly substantially perpendicular to the axis of the tube 15. A pin 28 is eccentrically mounted on the objective mount 16 and extends into the tube parallel to the tube axis and spaced from the adjacent tube wall a distance greater than the length of the short pin 27. At the top of the pin 28 is a head or bent portion 29 which extends toward the adjacent tube wall. In operation, the pins 27 and 28 will not interfere to limit the rotative movement of the objective lens mount 16 for focusing. It is only when the objective lens mount 16 is so far removed from the body tube 15 that the head 29 contacts with the short pin 27 to stop the movement of the mount 16 and prevents its removal from the body tube 15. Thus in the modifications shown in Figs. 1, 2, and 5, the objective mount 16 is free to rotate several times and so move through a substantial distance for fine adjustment while in Figs. 3 and 4, the movement of the mount 16 is limited to less than a full rotation.

From the foregoing it is apparent that I am able to attain the objects of my invention and provide a simple and effective fine adjustment mechanism for a relatively simple form of compound microscope. Various modifications can of course be made without departing from the spirit of my invention.

I claim:

1. A microscope comprising a base, an arm carried by said base, a body tube adjustably carried by said arm, means for moving said body tube for focusing an objective lens mount threadedly carried directly by said tube, means for rotating said objective lens to make small adjustments of focus, and means for limiting the rotation of said objective lens mount in both directions.

2. A microscope comprising a base, an arm carried by said base, a body tube carried by said arm, an objective lens mount, cooperating threads on said tube and on said mount for interconnecting said mount and said tube, means for rotating said mount relative to said tube to obtain small movements of said mount along the axis of said tube and cooperating means on said mount and on said tube to prevent removal of said mount.

3. In a device of the character described, a body tube, a first pin detachably secured to said tube and extending into said tube at substantially a right angle to the tube axis, an objective mount threadedly secured to said tube, means for rotating said mount for focusing and a second pin detachably secured to said mount and extending into said tube substantially parallel to the tube axis, said second pin being located adjacent the tube wall so as to cooperate with said first pin to limit the focusing movement of said mount.

4. In a device of the character described, a body tube, a first pin secured to the wall of said tube and extending into said tube a short distance, an objective mount threadedly secured to said tube, a second pin secured to said mount and extending into said tube, said second pin being spaced inwardly from the wall of said tube a distance greater than the length of said first pin, and a head on said second pin, cooperating with said first pin, to prevent removal of said mount from said tube.

WILLIAM BAUSCH.